United States Patent Office 3,449,600
Patented June 10, 1969

3,449,600
MHD GENERATOR FUELED BY SOLID GRAIN PROPELLANT
Allen L. Holzman, Palo Alto, and John J. Allport, Sunnyvale, Calif., assignors to United Aircraft Corporation, East Hartford, Conn., a corporation of Delaware
Filed Oct. 7, 1964, Ser. No. 402,246
Int. Cl. F02k 9/00
U.S. Cl. 310—11                    8 Claims The present invention relates to a solid grain for use in a gas generator and more particularly to a solid grain uniformly seeded with one or several components possessing relatively low ionization potentials. The seeded solid grain of the present invention has been found to have wide application in the solid rocketry art as will be evident upon consideration of the following objects and the subsequent detailed description.

It is an object of the present invention to provide a solid grain of unique composition which will permit the accurate measurement of total solid flow from a rocket engine and, therefore, the variations in regression and burning rates of the solid grain therein.

It is a further object to provide a solid grain of a unique composition which will permit accurate appraisals of the effect of variations in nozzle and motor geometry on motor performance.

It is a further object of the present invention to provide a novel method for generating magnetohydrodynamic electric power.

It is still a further object of the present invention to provide a novel and improved magnetohydrodynamic electric power generating apparatus.

These and further objectives will become apparent upon understanding the detailed description which follows with reference to the embodiments of the invention illustrated by way of example on the accompanying drawings in which.

Figure 1:
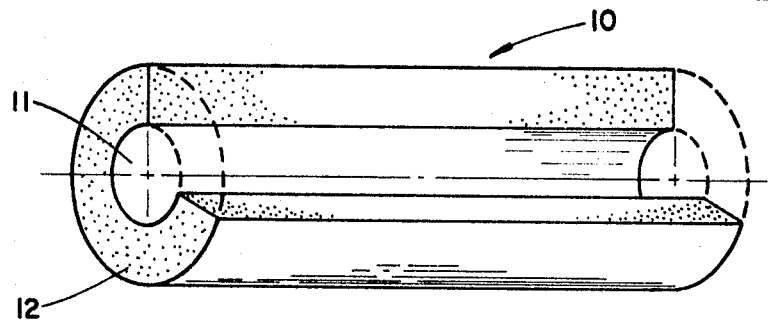
FIG. 1 illustrates a solid grain of the present invention.

As shown in FIG. 1, the present invention provides a solid grain 10 having, for example, a perforation 11 extending longitudinally therethrough. The soild grain is comprised of a conventional propellant homogeneously seeded with a component 12 having a low ionization potentional. For example, the present grain may be made of polymethyl methacrylate (fuel) and ammonium perchlorate (oxidizer) with potassium carbonate (seed component) homogeneously mixed therewith. Where on-off and throttling capabilities are desired, a hybrid grain may be used which is similarly seeded; however, because of the unique flexibility of the hybrid motors to the specific applications of the concept of present invention, it constitutes a generally preferred embodiment thereof.

Figure 2:
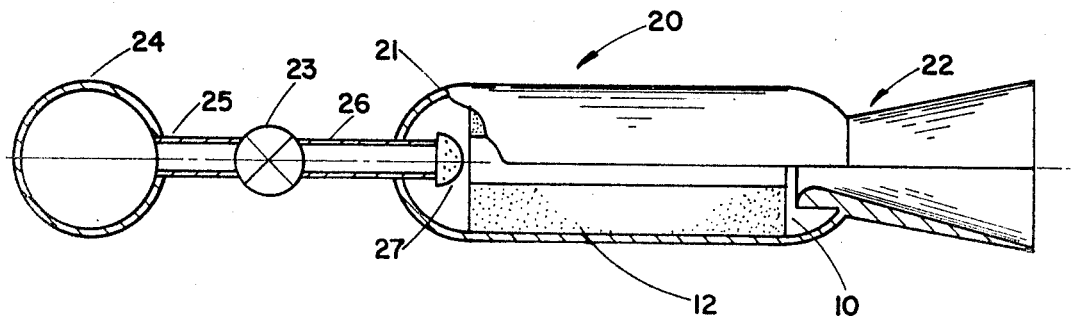
FIG. 2 illustrates a hybrid motor system employing a solid grain of the present invention.

As shown in FIG. 2, hybrid motor 20 is provided with a casing 21, nozzle portion 22, and grain 10 positioned so that upon opening valve 23, liquid or gaseous oxidizer from tank 24 will flow through lines 25 and 26 into shower head 27 thereby impelling oxidizer onto the grain surfaces for combustion therewith. In the event the fuel grain and oxidizer are not hypergolic, appropriate ignition means, not shown, may be used. Upon opening valve 23 and combustion of liquid oxidizer with the fuel grain 10, high temperature gases are produced which flow out nozzle 22 into the surrounding atmosphere. The seeded component 12, which may be present as separate particles or in chemical combination with a fuel component, is vaporized and passes out nozzle 22 as a part of the combustion gases. Because the seeded component 12 has a low ionization potential, it is readily ionized up to a certain limit, dependent upon its ionization characteristics, combustion conditions in the motor and nozzle design.

By using appropriate spectroscopic, microwave, and probe techniques, well-known in the art, the ionization component may be detected both qualitatively and quantitatively. Since the component 12 is distributed homogeneously throughout grain 10, an increase in the degree of ionization detected by the aforementioned techniques reflects, for one thing, an increase in total solid flow, thereby providing a technique for accurately measuring variation in regression rate and burning rate.

In addition, the seeded hybrid grain may be used for determining the effect of nozzle design on motor performance since the degree of ionization is also sensitively dependent upon temperature in the combustion zone. By holding constant all variables, such as rate of oxidizer injection and the degree of seeding of the hybrid grain while changing the nozzle design parameters, such as throat diameter and geometry of the convergent and divergent portions, it is possible to ascertain the variation in combustion conditions resulting from the altered nozzle parameters by simply measuring the ionization in the nozzle exit plane.

Figure 3:
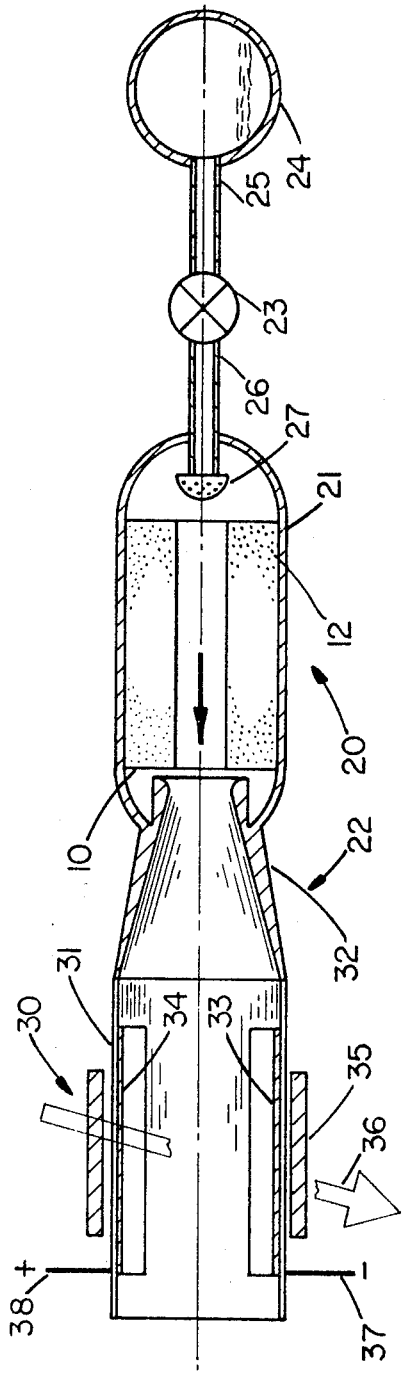
FIG. 3 shows in cross-section a magnetohydrodynamic electric power generator employing the solid grain of the present invention.

A very significant aspect of the present invention is the generation of unusually large quantities of electrical power by means of using the ionized combustion products in a magnetohydrodynamic power generating system. As shown in FIG. 3, a motor such as that set forth in FIG. 2 is placed in fluid communication with magnetohydrodynamic apparatus 30. Apparatus 30 is comprised of a channel 31 which is in sealed, fluid communication with the aft portion 32 of nozzle 22. The generator channel 31 may be constructed of any heat resistant material such as zirconia, in order to withstand the high temperatures of the exhaust gases passing out of the hybrid motor 20. Heat-resistant electrical contacts 33 and 34, such as tungsten, are placed along opposing internal faces of the channel in order that the ionized gases passing out of motor 20 will sweep across the two opposing electrical contacts. Means 35 is placed outside channel 31 in order to create magnetic field 36 which cuts across the gas flow. Means 35 for producing a magnetic field 36 may be a permanent magnet, a solenoidal coil system or an electromagnet. The basic requirement of means 35 is that it must create a field which is substantially transverse to the gas flow and is substantially non-normal to the electrodes 33 and 34.

By opening valve 23, oxidizer flows from tank 24 through lines 25 and 26 into the injector head 27 and reacts with seeded hybrid grain 10 to produce highly ionized exhaust gases that pass out nozzle 22 at extremely high velocities and temperatures. These gases then pass into channel 31, sweeping across electrical contacts 33 and 34. With lines of magnetic force 36 transverse to the longitudinal axis of the channel, the high velocity ionized gases cut across these lines of force to induce an electric potential across contacts 33 and 34. This potential when connected to a load by terminals 37 and 38 will cause a current to flow, thereby generating electrical power in the load and the generator. By suitable variations in the mass rate of flow or appropriate variations in the magnetic field, the impedence to the generator can be matched to the load and power output therefore maximized. In the event various DC and AC voltages and power levels are desired, an inverter may be placed in the system to produce an alternating current which can then be stepped up in voltage by transformers.

By means of this apparatus, it is possible to generate extremely high power outputs from the generator during the motor firing. Consequently, the generator of the present invention is most ideally suited for those applications where short duration, high electrical power demands exist. For example, the generator is extremely useful for welding and arc lighting systems. Moreover, it may be used together with appropriate power conditioning devices, as discussed above, for emergency power supplies. Several large hybrid motors running simultaneously would be able to supply sufficient power to take over all the electrical demands for the entire United States. Consequently, a series of these units could be used to supply power for extended periods of time during power failures and natural disasters.

A hybrid grain suitable for the general purposes of the present invention may be formulated by mixing 5 percent by weight of finely ground cesium nitrate with 95 percent by weight of a polymethyl methacrylate monomer. These ingredients are mixed until the finely ground cesium nitrate is homogeneously distributed, and then the mixture is polymerized in a suitable mold to form the desired grain shape. Mandrels of various configuration may be utilized in the casting process to produce a variety of perforation designs. Machining operations may also be performed on the solid grain for suitable mating of the case and grain. Also, the grain may be formed into a conventional end-burning grain for the purposes of the present invention.

In selecting appropriate seed components, it is necessary to use materials which will ionize readily (i.e. possess a low ionization potential measured in electron-volts) so that the gaseous effluent is a relatively good conductor of electricity. It has been found, generally, that alkali metals possess the desired low ionization potentials, and out of this group, cesium and potassium, because of their low ionization potentials and abundance, are most suitable for use as seed components in either the elemental or combined state. It is to be understood, however, that a wide variety of materials are suitable for seeding purposes, since the basic requirement is that the seed particles be readily ionized. It will be clear to those skilled in the art that a grain may contain only one such seed component or it may contain a large number of such components.

As discussed above, the solid grain of the present invention may have a variety of physical configurations such as multiple perforations or perforations of various geometry. Also, by obvious design modifications, end-burning grains may be used for the purpose of the present invention provided the seed component is uniformly distributed throughout the grain. Accordingly, it is to be understood that the specific embodiments of the invention herein disclosed are of a descriptive rather than a limiting nature, and that various changes, combinations, substitutions or modifications may be employed in accordance with these teachings without departing either in spirit or scope from this invention in its broader aspects.

We claim:

1. A method for producing electrical energy from a magnetohydrodynamic generator of the class that employs high temperature gases for the ionized fluid flowing therethrough comprising using as the high temperature gas the gaseous effluent from a hybrid rocket motor having a solid propellant grain incapable of self-sustained combustion containing a predetermined amount of at least one component possessing a low ionization potential.

2. A method as in claim 1 wherein the components having a low ionization potential are selected from the group consisting of alkali metals and compounds of alkali metals.

3. A method as in claim 1 wherein the components having a low ionization potential are selected from the group consisting of elemental cesium and potassium and compounds of cesium and potassium.

4. An electrical generator comprised of a heat resistant hollow conduit having two open ends, first and second opposing heat resistant electrodes located on the inside surface of said conduit, means for creating a magnetic field across said conduit, and a hybrid rocket motor in fluid communication with said conduit said motor containing a solid propellant grain incapable of self-sustained combustion containing a predetermined amount of at least one component possessing a low ionization potential.

5. An electrical generator as in claim 4 wherein the components having a low ionization potential are selected from the group consisting of alkali metals and compounds of alkali metals.

6. An electrical generator as in claim 4 wherein the components having a low ionization potential are selected from the group consisting of elemental cesium and potassium and compounds of cesium and potassium.

7. In a method for the magnetohydrodynamic generation of electricity which comprises generating an ionized gas stream, passing said stream between spaced electrodes and through a magnetic field maintained between said electrodes whereby an electromotive force is produced across said electrodes, the improvement which comprises generating said ionized gas stream in the combustion chamber of a hybrid rocket motor by the reaction of a fluid propellant component and a solid propellant component said solid propellant component being incapable of self-sustained combustion and having uniformly dispersed therethrough a readily ionizable material selected from the group consisting of alkali metals and compounds of alkali metals.

8. In a magnetohydrodynamic electrical generator comprising a pair of spaced electrodes, means for maintaining a magnetic field between said electrodes and means for directing a stream of ionized gases through said magnetic field and across said electrodes whereby an electromotive force is generated across said electrodes upon passage of said gas stream therebetween; the improvement which comprises a hybrid rocket motor for generating said ionized gas stream, said motor having a combustion chamber, exhaust means in fluid communicating relationship with said spaced electrodes and the interior of said combustion chamber, means for supplying a fluid propellant component to the interior of said combustion chamber, means for controlling the rate of flow of said fluid propellant to said combustion chamber, a solid propellant component within said combustion chamber, said solid propellant component having dispersed therethrough an ionizable material selected from the group consisting of alkali metal and alkali metal compound, said solid propellant component being incapable of self-sustained combustion and being reactive with said fluid propellant component to produce hot ionized gases.

References Cited

UNITED STATES PATENTS 3,099,131 7/1963 Rosa _____ 310—11
3,115,007 12/1963 Fox _____ 60—251

DAVID X. SLINEY, *Primary Examiner.*

U.S. Cl. X.R.

60—251